United States Patent Office 3,395,142
Patented July 30, 1968

3,395,142
AMINOETHYLENE COMPOSITIONS
David Henry Clemens, Willow Grove, Pa., assignor to Rohm & Haas Company, Philadelphia, Pa., a corporation of Delaware
No Drawing. Filed Nov. 27, 1963, Ser. No. 326,373
9 Claims. (Cl. 260—240)

ABSTRACT OF THE DISCLOSURE

Novel diaminoethylene compositions formed by the reaction of diaminoethylenes and isocyanates or isothiocyanates which are useful as fungicides and herbicides are provided. Typical compositions are 1,1-di-(1-piperidinyl)-2-(N-phenylcarbamyl)-ethylene and 1,1-di-(piperidinyl) - 2 - (N - 3,4 - dichlorophenylcarbamyl) - ethylene.

---

This invention deals with diaminoethylenes that may be represented by the following general formula

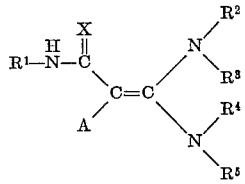

wherein A is selected from the group consisting of a hydrogen atom and an amido radical

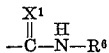

In the formula, X and $X^1$ may be either an oxygen atom or a sulfur atom. Compounds in which X and/or $X^1$ is oxygen are derived from isocyanates and compounds in which X and/or $X^1$ is sulfur are derived from isothiocyanates. X and $X^1$ may be the same or different. The substituents $R^1$ to $R^6$ can be alkyl, aryl, alkaryl, and aralkyl. When $R^2$ and $R^3$, on one hand, and $R^4$ and $R^5$, on the other, are taken together with the nitrogen atom onto which they are bonded, they form a piperidinyl, a morpholinyl, or a pyrrolidinyl ring that may be represented by the formula $C_nH_{2n}(O)_xN-$ where $n$ is 2 or 5 and $x$ is zero with the proviso that when $x$ equals 1, then $n$ is 4 and when $x$ is zero, $n$ is 4 or 5. The R groups may be the same or different. They may be substituted with a wide variety of substituents which are inert to isocyanates or isothiocyanates. Typical of the $R^1$ and $R^6$ groups are: methyl, ethyl, propyl, butyl, amyl, hexyl, n-octyl, di-octyl, 4-octyl, dodecyl, decyl, octadecyl, 4-cyanobutyl, 4-chlorobutyl, phenyl, o-chlorophenyl, m-chlorophenyl, p-chlorophenyl, 3,4-dichlorophenyl, 2,5-dichlorophenyl, p-methoxyphenyl, p-cyanophenyl, o-bromophenyl, p-iodophenyl, phenethyl, benzyl, p-chlorobenzyl, p-methoxybenzyl, p-iodobenzyl and the like.

Typical of the compounds of the invention are the following:

1,1-di-(1-piperidinyl)-2-(N-phenylthiocarbamyl)-ethylene
1,1-di-(1-piperidinyl)-2-(n-octylthiocarbamyl)-ethylene
1,1-di-(1-piperidinyl)-2-(n-octadecylthiocarbamyl)-ethylene
1,1-di-(1-piperidinyl)-2-(phenethylthiocarbamyl)-ethylene
1,1-di-(1-piperidinyl)-2-(N-ethylthiocarbamyl)-ethylene
1,1-di-(diethylamino)-(N-ethylthiocarbamyl)-ethylene
1,1-di-(dioctadecylamino)-2-(N-ethylthiocarbamyl)-ethylene
1,1-di-(1-piperidinyl)-2-(N-phenylcarbamyl)-ethylene
1,1-di-(1-piperidinyl)-2-(N-2,5-dichlorophenylcarbamyl)-ethylene
1,1-di-(1-piperidinyl)-2,2-di-(N-phenylthiocarbamyl)-ethylene
1,1-di-(1-piperidinyl)-2,2-di-(N-ethylthiocarbamyl)-ethylene
1,1-di-(1-piperidinyl)-2,2-di-(N-phenylcarbamyl)-ethylene
1,1-di-(diethylamino)-2,2-di-(N-phenylcarbamyl)-ethylene
1,1-di-(di-n-octadecylamino)-2,2-di-(N-phenylcarbamyl)-ethylene
1,1-di-(1-piperidinyl)-2,2-di-(N-2-phenylethylthiocarbamyl)-ethylene
1,1-di-(1-piperidinyl)-2,2-di-(N-ethylcarbamyl)-ethylene
1,1-di-(1-piperidinyl)-2,2-di-(N-3,4-dichlorophenylcarbamyl)-ethylene
1,1-di-(piperidinyl)-2,2-di-(N-2,5-dichlorophenylcarbamyl)-ethylene
1,1-di-(1-piperidinyl)-2-(N-phenylcarbamyl)-2-(N-n-octylcarbamyl)-ethylene.

The diaminoethylenes of the invention may be prepared by a unique process which comprises contacting a tetrasubstituted diaminoethylene with an isocyanate or isothiocyanate of the formula $R^1N=C=X$ wherein $R^1$ and X have been defined above. When one mole of isocyanate or isothiocyanate is used per mole of diaminoethylene the product of the reaction had the generic formula in which A is hydrogen and when two moles of the isocyanate or isothiocyanate are used per mole of diaminoethylene the product has the generic formula in which A represents the designated amido radical. When intermediate amounts between 1 and 2 moles are used, mixtures of these products result. These reactions of the invention may be illustrated as follows:

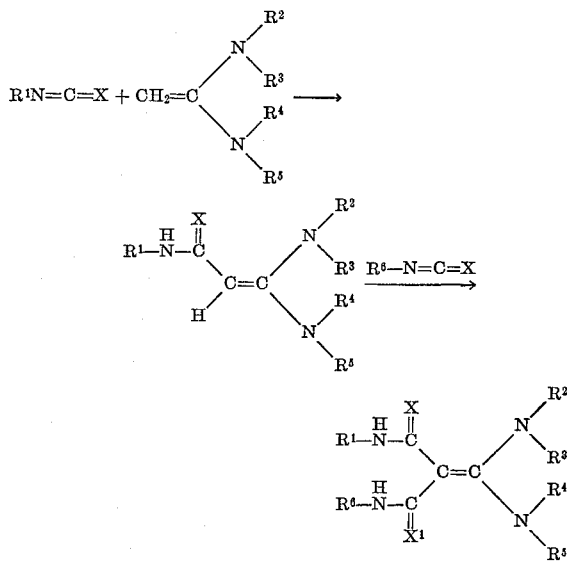

in which $R^1$ and $R^6$, as defined above, may be the same or different substituents.

The diaminoethylene in which R and $R^1$ and X and $X^1$ are different is obtained by reacting the diaminoethylene in which A is hydrogen with a different isocyanate or isothiocyanate or reacting the unsubstituted diaminoethylene with a mixture of different isocyanates or isothiocyanates.

The process of this invention may be carried out at any desired temperature short of that decomposing the reactants. In general a temperature range of —20° to 150° C. is satisfactory. A range of from 20° C. to 70° C.

is preferred. The time required for the reaction depends on the reactivity of the particular isocyanate or isothiocyanate and diaminoethylene used. In the preferred temperature range 2 to 20 hours will generally be sufficient for completion of the reaction. Somewhat longer times may be required at low temperatures. The process may be carried out in the presence or absence of a solvent. If a solvent is used, it must be one which is unreactive with (and which is inert to) the isocyanate or isothiocyanate.

Particularly useful solvents include esters, ethers, nitriles, ketones, hydrocarbons, chlorinated hydrocarbons, and the like. Examples include methyl acetate, ethyl acetate, butyl propionate, ethylene glycol, dimethyl ether, diethyl ether, dipropyl ether, acetonitrile, acetone, methyl ethyl ketone, dibutyl ketone, cyclohexane, heptane, decane, benzene, toluene, xylene, methylene chloride, chloroform, tetrachloroethylene and the like. Solvents to be avoided are alcohols and primary and secondary amines which will react with the isocyanate or isothiocyanate.

Many of the isocyanates and isothiocyanates used in the practice of this invention are commercially available or may be readily synthesized by well-known reactions. Typical are the following: methyl, ethyl, propyl, butyl, decyl, octadecyl, 4-cyanobutyl, 4-chlorobutyl, phenyl, o-chlorophenyl, m-chlorophenyl, p-chlorophenyl, 3,4-dichlorophenyl, 2,5-dichlorophenyl, p-methoxyphenyl, p-cyanophenyl, o-bromophenyl, p-iodophenyl, phenethyl, benzyl, p-chlorobenzyl, p-methoxybenzyl, p-iodobenzyl, and the like. $R^2$, $R^3$, $R^4$ and $R^5$ in generic formulas are alkyl groups of from 1 to 20 carbon atoms. $R^2$, $R^3$, $R^4$, and $R^5$ may be the same or different. Typical $R^2$, $R^3$, $R^4$, and $R^5$ groups include methyl, ethyl, propyl, butyl, amyl, hexyl, n-octyl, di-octyl, 4-octyl, dodecyl, octadecyl, benzyl, phenyl, phenethyl, and the like.

The compounds of this invention are useful as fungicides and herbicides and also as chemical intermediates. In particular, the diaminoethylenes of the invention react with strong acids to give the amidinium salts. These are useful fungicides and herbicides. Typical strong acids have a dissociation constant of at least $10^{-4}$, such as HCl, HBr, $HBF_4$, $H_2SO_4$, $H_3-AsO_4$, bromoacetic acid, $HClO_4$, chloro acetic (also the dichloro- and trichloro-), acetic, fumaric, $HIO_3$, oxalic, phosphoric, picric, $H_3PO_3$, $H_2SO_2$, $H_2SO_3$, and the like.

The diaminoethylenes of the invention are active fungicides. In the standard fungitoxicity tests with coated slides (Phytopathology 33, 627 (1943)), there is determined the $LD_{50}$ value, the concentration at which inhibition of germination of 50% of the spores of the test organism is obtained. The $LD_{50}$ values are obtained against *Stemphylium sarcinaeforme, Alternaria solani*, and *Sclerotinia sclerotorium*. Moreover, the diaminoethylenes of the invention are of considerable interest as herbicides by virtue of their post-emergence activity. There were planted separate plots of wild oat, dock, millet, and mallow. Two weeks after the plants had developed, they were sprayed with aqueous dispersions of the compounds of the invention at the rate of 10 lbs. per arce. After another two weeks, observations were made as to the kill of plants. Kill was observed for all grasses. For instance, with 1,1-di - (1-piperidinyl)-2-(N-phenylcarbamyl)-ethylene, 80% kill of millet was recorded. With 1,1-di-(piperidinyl)-2-(N-3,4-dichlorophenylcarbamyl)-ethylene, 90% kill of millet was observed. A 100% kill of mallow is noted for 1,1 - di-(1-piperidinyl)-2,2-di-(N-phenylcarbamyl)-ethylene, 1,1-di-(piperidinyl)-2,2-di-(N-2,5-dichlorophenylcarbamyl) - ethylene, and 1,1-di-(1-piperidinyl)-2,2-di-(N-ethylcarbamyl)-ethylene.

The diaminoethylene compounds of the invention may be compounded into fungicidal and herbicidal compositions by any suitable methods known in the art. They can be applied in a dispersion or in a mixture with a solid carrier. The compounds may be extended with a finely divided inert solid or they may be applied in solution, with or without a surface-active agent. Further compositions are known in the art as in U.S. Patents Nos. 3,080,225; 3,065,066; 3,052,707; 3,050,526; and others.

Example 1

To a stirred mixture of 8.11 parts of phenyl isothiocyanate and 35 ml. of toluene is added a solution of 11.66 parts of 1,1-di-(1-piperidinyl)-ethylene in 40 ml. of toluene. An exotherm is noted and after 10 minutes a yellow solid begins to precipitate. An additional 75 ml. of toluene is added and the reaction allowed to stir overnight. Filtration yields 17 parts (86%) of 1,1-di-(1-piperidinyl) - 2 - (N - phenylthiocarbamyl) - ethylene with a melting point of 154–156° C. It is recrystallized from a toluene-chloroform mixture to give material melting at 155–157° C., $\lambda_{max}$. 305 m$\mu$ ($\epsilon$=21,500), 367 m$\mu$ ($\epsilon$=21,500).

This compound is an effective fungicide against *Stemphilium sarcinaeforme, Alternaria solani*, and *Sclerotinia sclerotorium* giving $LD_{50}$ values of 50–200 p.p.m. in standard fungitoxicity tests.

Example 2

The procedure of Example 1 is followed with 11.9 parts of 1,1-di-(1-morpholinyl)-ethylene substituted for the 1,1-di-(1-piperidinyl)-ethylene used above. The product is 1,1-di-(1-morpholinyl)-2-(N-phenylthiocarbamyl)-ethylene.

Example 3

The procedure of Example 1 is followed with 9.9 parts of 1,1-di-(1-pyrrolidinyl)-ethylene substituted for the 1,1-di-(1-piperidinyl)-ethylene used above. The product is 1,1-di-(1-pyrrolidinyl) - 2 - (N-phenylthiocarbamyl)-ethylene.

Example 4

The procedure of Example 1 is followed except that 10.3 parts n-octyl isothiocyanate are substituted for the phenyl isothiocyanate. The product is 1,1-di-(1-piperidinyl)-2-(n-octylthiocarbamyl)-ethylene.

Example 5

The procedure of Example 1 is repeated except that 18.7 parts of n-octadecyl isothiocyanate are substituted for the phenyl isothiocyanate. The product is 1,1-di-(1-piperidinyl)-2-(n-octadecylthiocarbamyl)-ethylene.

Example 6

The procedure of Example 1 is repeated except that 9.8 parts of β-phenethyl isothiocyanate are substituted for the phenyl isothiocyanate. The product is 1,1-di-(1-piperidinyl)-2-(phenylethylthiocarbamyl)-ethylene.

Example 7

To a stirred solution of 1.74 parts of ethyl isothiocyanate in 25 ml. of toluene is added a solution of 3.89 parts of 1,1-di-(1-piperidinyl)-ethylene in 25 ml. of toluene. The reaction immediately takes on a bright yellow color. After standing overnight, volatile materials are removed on a rotating evaporator, leaving a partially solidified residue which is triturated with heptane to yield 1.6 parts (28%) of 1,1-di-(1-piperidinyl)-2-(N-ethylthiocarbamyl)-ethylene at a melting point of 95–108° C. After recrystallization from an ethanol-water mixture, the product melts at 113.5–115° C.

Example 8

The procedure of Example 7 is repeated except that 3.41 parts of 1,1-di(diethylamino)-ethylene are substituted for the 1,1-di-(1-piperidinyl)-ethylene. The product is 1,1-di-(diethylamino)-(N-ethylthiocarbamyl)-ethylene.

Example 9

The procedure of Example 7 is repeated except that 41.52 parts of 1,1-di-(dioctadecylamino)-ethylene are substituted for the 1,1-di-(1-piperidinyl)-ethylene. The product is 1,1 - di - (dioctadecylamino)-2-(N-ethylthiocarbamyl)-ethylene.

Example 10

To a stirred solution of 7.77 parts of 1,1-di-(1-piperidinyl)-ethylene in 25 ml. of ether is added dropwise a solution of 4.76 parts of phenyl isocyanate in 25 ml. of ether. An exotherm is noted and white solid precipitates in such quantities that an additional 25 ml. of ether is needed to make the slurry stirrable. Filtration yields 11.3 parts (90%) of 1,1 - di - (1 - piperidinyl)-2-(N-phenylcarbamyl)-ethylene with a melting point at 162° to 165° C. Recrystallization from toluene raises the melting point to 163–165° C. with decomposition.

This compound when applied at the rate of 10 lb./acre is effective to give a kill of 90% of millet and of 70% of mallow in post emergence tests.

Example 11

The procedure of Example 10 is repeated except that 6.2 parts of isooctyl isocyanate are substituted for the phenyl isocyanate. The product is 1,1-di-(1-piperidinyl)-2-(N-isooctylcarbamyl)-ethylene.

Example 12

The procedure of Example 10 is repeated except that 43.0 parts of 1,1-di-(dioctadecylamino)-ethylene are substituted for the 1,1-di-(1-piperidinyl)-ethylene. The product is 1,1-di-(dioctadecylamino)-2-(N-phenylcarbamyl)-ethylene.

Example 13

The procedure of Example 10 is repeated using 7.29 parts of 1-(1-piperidinyl)-1-diethylaminoethylene in place of the 1,1-di-(1-piperidinyl)-ethylene. The product is 1-(1 - piperidinyl)-1-diethylamino-2-(N-phenylcarbamyl)-ethylene.

Example 14

To a stirred solution of 4.76 parts of 1,1-di-(1-piperidinyl)-ethylene in 50 ml. of ether is added over a 5-minute period a solution of 5.0 parts of 3,4-dichlorophenyl isocyanate in 50 ml. of ether. About 7 minutes after the addition is complete, a copious precipitate forms and an additional 100 ml. of ether is added to keep the slurry stirrable. After 30 minutes stirring filtration yields 8 parts of 1,1-di-(1-piperidinyl)-2-(N-3,4-dichlorophenylcarbamyl)-ethylene with a melting point at 134°–136° C. Over a 3-day period the filtrate affords an additional 1 part of the same material, giving a total yield of 9.0 parts (94%), $\lambda_{max.}$ 25 m$\mu$ ($\epsilon$=18,500), 325m$\mu$ ($\epsilon$=19,100). The melting point is not changed by recrystallization from acetone.

Both millet and mallow grasses were killed at a rate of 90% in post emergence tests at a 10 lb./acre-rate with this compound.

Example 15

To a stirred solution of 10.90 parts of 1,1-di-(1-piperidinyl)-ethylene in 150 ml. of ether is added a solution of 10.53 parts of 2,5-dichlorophenyl isocyanate in 50 ml. of ether. After stirring overnight the 1,1-di-(1-piperidinyl)-2-(N-2,5-dichlorophenylcarbamyl)-ethylene is filtered off and recrystallized from isopropanol. The product melts at 132°–133° C. $\lambda_{max.}$ 250 m$\mu$ ($\epsilon$=22,800), 322 m$\mu$ ($\epsilon$=21,000).

Oat, dock, millet and mallow grasses were killed in post emergence tests with compositions of this compound.

Example 16

A mixture of 5 parts of 1,1-di-(1-piperidinyl)-ethylene, 20.0 parts of phenyl isothiocyanate and 200 ml. of tetrahydrofuran is stirred together. Volatile materials are removed under reduced pressure using a rotating evaporator and warm water bath. After washing with small portions of acetonitrile and air drying there remain 11.0 parts (90%) of 1,1 - dipiperidinyl - 2,2 - di(N - phenylthiocarbamyl)-ethylene. After recrystallization from acetonitrile it melts at 151°–152° C.

A 100% kill of mallow grass was observed in post emergence tests with this compound.

Example 17

A mixture of 4.0 parts of 1,1-di-(1-piperidinyl)-ethylene, 3.5 parts of ethyl isothiocyanate and 50 ml. of toluene is heated almost to reflux for five hours and then allowed to stand for two days. The reaction mixture, which contains much precipitated solid, is cooled in ice and filtered to yield 4.5 parts (60%) of 1,1-di-(1-piperidinyl) - 2,2 - di-(N-ethylthiocarbamyl)-ethylene having a melting point of 186–188° C. Recrystallization from toluene raises the decomposition point to 187–189° C., $\lambda_{max.}$ 268 m$\mu$ ($\epsilon$=22,500), 351 m$\mu$ ($\epsilon$=16,800).

Example 18

To a solution of 4.76 parts of phenyl isocyanate in 35 ml. of ether is added a solution of 3.9 parts of 1,1-di-(1-piperidinyl)-ethylene in 20 ml. of ether. An exotherm and some refluxing of the ether are noted. After stirring over the weekend the reaction mixture is filtered to yield 7.5 parts (87%) of 1,1-di-(1-piperidinyl)-2,2-di-(N-phenylcarbamyl)-ethylene, having a melting point of 212–213° C., $\lambda_{max.}$ 288 m$\mu$ ($\epsilon$=22,100), 332 m$\mu$ ($\epsilon$=11,316). Recrystallization from dimethylformamide does not change the decomposition point.

Example 19

The procedure of Example 16 is repeated except that 3.4 parts of 1,1-di-(diethylamino)-ethylene are substituted for the 1,1-di-(1-piperidinyl)-ethylene. The product is 1,1 - di - (diethylamino) - 2,2 - di - (N-phenylcarbamyl)-ethylene.

Example 20

The procedure of Example 16 is repeated except that 21.5 parts of 1,1-di-(di-n-octadecylamino)-ethylene are substituted for the 1,1-di-(1-piperidinyl)-ethylene. The product is 1,1 - di - (di - n - octadecylamino) - 2,2-di-(N-phenylcarbamyl)-ethylene.

Example 21

The procedure of Example 16 is repeated except that 6.5 parts of 2-phenylethylisothiocyanate are substituted for the phenyl isocyanate. The product is 1,1-di-(1-piperidinyl)-2,2-di-(N-2-phenylethylthiocarbamyl)-ethylene.

Example 22

To a stirred solution of 4.1 parts of ethyl isocyanate in 60 ml. of ether is added a solution of 5.44 parts of 1,1-di-(1-piperidinyl)-ethylene in 40 ml. of ether. After standing overnight there are filtered off 5.5 parts (58%) of 1,1 - di-(1-piperidinyl)-2,2-di-(N-ethylcarbamyl)-ethylene, having a melting point of 187–189° C. Recrystallization from toluene raises the decomposition point to 188–190°, $\lambda_{max.}$ 251 m$\mu$ ($\epsilon$=21,000), 318 m$\mu$ ($\epsilon$=14,100). A 100% kill of mallow grass was observed in post emergence tests with this compound.

Example 23

To a stirred solution of 11.67 parts of 3,4-dichlorophenyl isocyanate in 150 ml. of ether is added dropwise a solution of 5.45 parts of 1,1-di-(1-piperidinyl)-ethylene in 50 ml. of ether. A precipitate begins to form immediately and when the addition is about one-half complete, an additional 100 ml. of ether is added to keep the slurry stirrable. After stirring overnight there are isolated by filtration 15.1 parts (89%) of 1,1-di-(1-piperidinyl)-2,2-di-(N-3,4-dichlorophenylcarbamyl)-ethylene having a melting point of 200 to 202° C. Recrystallization from toluene raises the decomposition point to 201–203° C., $\lambda_{max.}$ 254 m$\mu$ ($\epsilon$=18,200), 300 m$\mu$ ($\epsilon$=40,500) and $\lambda_{max.}$ 328 m$\mu$ ($\epsilon$=20,400).

Example 24

To a stirred solution of 14.73 parts of 2,5-dichlorophenyl isocyanate in 150 ml. of ether is added a solution of 7.58 parts of 1,1-di-(1-piperidinyl)-ethylene in 50 ml. of ether. A precipitate begins to form almost immediately. After stirring for 4.5 hours there are isolated by filtration 18.6 parts (83%) of crude 1,1-di-(1-piperidinyl)-2,2-di-(N - 2,5 - dichlorophenylcarbamyl) - ethylene. After recrystallization from a tetrahydrofuran-toluene mixture it decomposes at 237–238° C.

A 100% kill of mallow grass was observed in post emergence tests with this compound.

Example 25

To a mixture of 12.5 parts of 1,1-di-(1-piperidinyl)-2-(N-phenylcarbamyl)-ethylene and 200 ml. of ether are added 6.2 parts of n-octyl isocyanate and the reaction mixture allowed to stir one week at room temperature. The product is 1,1-di-(1-piperidinyl)-2-(N-phenylcarbamyl)-2-(N-n-octylcarbamyl)-ethylene.

The diaminoethylenes that are reacted with the isocyanates, in accordance with this invention, may be prepared by known methods such as by reaction of ethoxy acetylene with secondary amines as described by J. F. Arens and Th. R. Rix, Koninki. Med. Akad. Wetenschap. Proc. 57B, 270–80 (1954) or the reaction of ethyl orthoacetate with secondary amines as described by Baganz and Domaschke, Ber. 95, 2095–6 (1962).

I claim:

1. A diaminoethylene compound of the formula

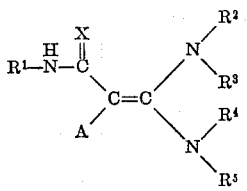

in which A is selected from the group consisting of a hydrogen atom and an amido radical

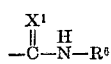

X and X¹ are each selected from the group consisting of an oxygen and a sulfur atom, the substituents $R^1$ and $R^6$ are each one when considered individually, selected from the group consisting of alkyl containing 1 to 18 carbon atoms, cyano and halogen substituted alkyl containing 1 to 18 carbon atoms, phenyl, halogen, methoxy and cyano substituted phenyl, benzyl and phenethyl, and halogen and methoxy-substituted benzyl and phenethyl, and the substituents $R^2$, $R^3$, $R^4$, and $R^5$ are each one, when considered individually, selected from the group consisting of alkyl containing 1 to 18 carbon atoms, phenyl, benzyl and phenethyl, and when $R^2$ and $R^3$ on one hand, and $R^4$ and $R^5$ on the other hand, are joined together through the nitrogen atom onto which they are both bonded, they are selected from the group consisting of piperidinyl, and morpholinyl and pyrrolidinyl.

2. A diaminoethylene compound of the formula

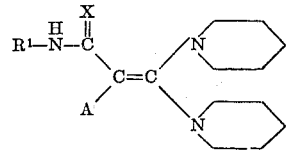

in which A is selected from the group consisting of a hydrogen atom and an amdio radical

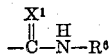

X and X¹ are each selected from a group consisting of oxygen and a sulfur atom, and the substituents $R^1$ and $R^6$ are each one, when considered individually, selected from the group consisting of alkyl containing 1 to 18 carbon atoms, cyano and halogen-substituted alkyl containing 1 to 18 carbon atoms, phenyl, halogen, methoxy and cyano substituted phenyl, benzyl and phenethyl, and halogen and methoxy-substituted benzyl and phenethyl.

3. The diaminoethylene compond of claim 2 in which A is hydrogen.

4. The diaminoethylene compound of claim 2 in which X is oxygen.

5. The diaminoethylene compound of claim 2 in which X is sulfur.

6. The diaminoethylene compound of claim 2 in which A is a hydrogen atom and $R^1$ is phenyl.

7. The diaminoethylene compound of claim 2 in which $R^1$ is chlorophenyl.

8. The diaminoethylene compound of claim 2 in which $R^1$ and $R^6$ are each one an alkyl group from 1 to 18 carbon atoms.

9. The diaminoethylene compound of claim 2 in which $R^6$ is ethyl.

References Cited

UNITED STATES PATENTS 2,883,368  4/1959  Middleton _____ 260—78.4

OTHER REFERENCES

Coener: Chem., Ber., vol. 80, pp. 546–550 (1947).

Hunig et al.: Chem. Ber., vol. 95, pp. 926–929 (1962).

Baganz et al.: Chem. Ber., vol. 85, pp. 2095–2096 (1962).

Houben-Weyl: Methoden der Organische Chermie, 4th ed., Bond VIII, p. 133, Georg Thieme Verlag, Stuttgart, Germany (1952).

McElvain et al.: J. Am. Chem. Soc. vol. 67, pp. 202–204 (1945).

JOHN D. RANDOLPH, *Primary Examiner.*